Oct. 19, 1965  J. P. STRASSER  3,212,811
VEHICLE HEADLINERS
Filed Jan. 22, 1962
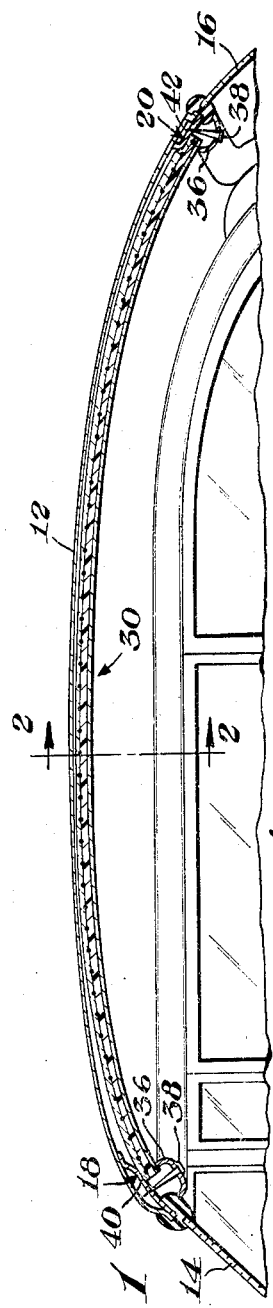
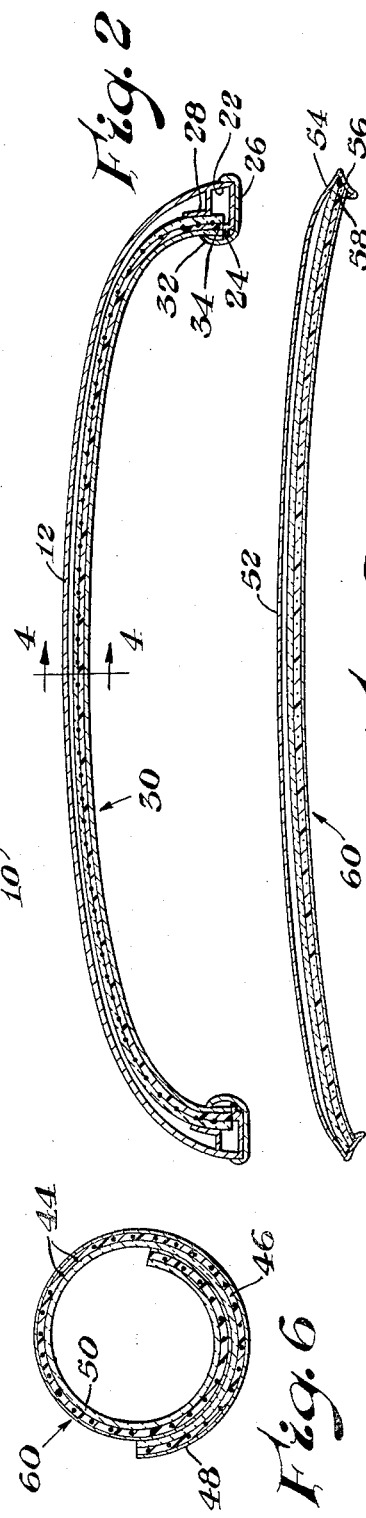
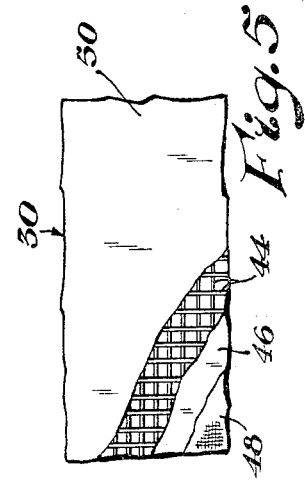
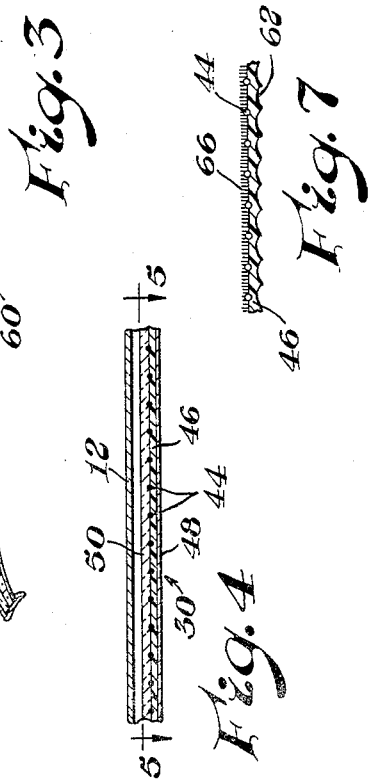
INVENTOR.
Joseph P. Strasser
BY
ATTORNEY United States Patent Office 3,212,811
Patented Oct. 19, 1965

3,212,811
VEHICLE HEADLINERS
Joseph P. Strasser, Midland, Mich., assignor to The Dow Chemical Company, Midland, Mich., a corporation of Delaware
Filed Jan. 22, 1962, Ser. No. 167,700
3 Claims. (Cl. 296—137)

This invention relates generally to vehicle headliners and, more particularly, relates to snap-in headliners for vehicle ceilings and the like, comprising specially formed thermoplastic and other materials.

Prior to the present invention, to obtain satisfactory vehicle headliners which would not sag under their own weight, it had been common to make them of rather rigid materials such as fiberglass, bonded with thermosetting polyesters. A contributing factor to the cost of the above rather expensive material was the use of the thermosetting polyesters which require considerable effort because of the required high exposure to heat to accomplish catalyzation of the thermoset reaction, this having to be accomplished in reasonable production time periods. Furthermore, such headliner structures have only a small degree of flexibility which renders them difficult to install in a vehicle roof, if often being necessary to install these headliners before complete body assembly of the vehicle.

To improve on the above prior headliners and to provide a headliner structure being lightweight, flexible, and possessing the proper strength requirements (as expressed by resistance to deformation under stress of their own weight) many other materials had been investigated in the past. Such prior structures have also failed to be satisfactory because of either their high cost or their insufficient balance between weight and strength. Notably, thermoplastic materials had previously failed as satisfactory headliners because of their lack of strength, especially in conditions of high temperature often encountered in the interior of vehicles. Although such thermoplastic materials sometimes exhibited desirable degrees of rigidity and flexibility at lower temperatures, when in use the high temperatures encountered resulted in a release of internal stresses and they would lose their resiliency to the extent that they often became loose or rattled.

Wire alone had been used as the body of a headliner also. However, because of the coarseness of the wire it was generally necessary to attach a decorative fabric material to the underside of the wire. This proved unsatisfactory because there was presented the problem of a noncontinuous backing for the fabric material and the adhesive used to attach the fabric to the wire mesh generally struck through the fabric material. Furthermore, to have a wire mesh of the proper resilient material, and one which would not deteriorate due to rust and the like, a relatively expensive wire such as stainless steel was necessary.

Accordingly, it can be seen that an ideal headliner would be that which consists of relatively inexpensive materials and which can be manufactured on a production basis simply and inexpensively. It is further seen that a good auto headliner should be one with a snap-in type construction so that it may be placed in position within a vehicle body even after the latter has been completely assembled, except for this component. In line with this it can be further seen that it would be advantageous for such a headliner to roll up without deforming, at least for insertion within the vehicle body through a door and window opening. The headliner should also show enough recovery ability so as to regain its original planar construction to rapidly snap into place when unrolled. Because of the high temperatures often reached in vehicle roof assemblies the material used must desirably be one which can sustain its own weight without sagging at higher temperatures, sometimes exceeding 180° F. It is also desirable that the headliner should be readily adapted to have a fabric easily attached to the underside thereof and an insulating material on the upperside thereof to provide for adequate insulation and attractive appearance within the vehicle.

It is thus a purpose of the present invention to provide for vehicle headliners possessing all of the above advantageous and otherwise desirable features.

It is another object of the present invention to provide for vehicle headliners having all of the above advantageous and otherwise desirable features without the disadvantages of prior headliner structures as enumerated above.

In accord with the above objects it is an object of the present invention to provide vehicle headliners comprised of a reinforced thermoplastic body embodying adequate flexibility and recovery, as well as rigidity, to be adapted for snap-in installation.

Briefly then, the present invention makes use of thermoplastic materials, in sheet form, weights and gauges not ordinarily capable of supporting their own weight without sagging, especially at higher temperatures. The thermoplastic sheet provides an economical surface which is simply tacky for adhesion of decorative fiber on the underside or face, and sound deadening padding or foam on the upperside or back. Resistance to sagging and rigidity, especially at the higher temperatures, are contributed to by use of wire mesh screening embedded in the plastic sheet. This sheet, by proper selection of gauge and plastic composition, can be rolled into a cylinder, if desired, for installation in the confined space of a vehicle interior. The thinness of such a unit is particularly valuable in automotive headliners, where space is at a premium.

Yet additional objects and advantages of the present invention, and its numerous cognate benefits and features are even more apparent and manifest in and by the ensuing description taken in conjunction with the accompaying drawing in which wheresoever possible, like characters of reference designate corresponding material and parts throughout the several views thereof, in which:

FIGURE 1 is a longitudinal sectional view through a vehicle roof employing a headliner illustrating the principles of the present invention;

FIGURE 2 is a transverse sectional view of the vehicle roof taken along the reference line 2—2 of FIGURE 1;

FIGURE 3 is a view similar to FIGURE 2 only illustrating a transverse sectional view of a modified vehicle roof;

FIGURE 4 is an enlarged fragmentary cross-sectional view of the headliner and roof structure of FIGURE 2 taken generally along the reference line 4—4 thereof;

FIGURE 5 is a planar view, partially broken away, of the headliner of FIGURE 4 taken along the reference line 5—5 thereof;

FIGURE 6 is a rolled up cylinder of a headliner of the present invention illustrating the flexibility thereof; and FIGURE 7 is a cross-sectional view of a modified headliner illustrating the principles of the present invention.

Referring more particularly to FIGURES 1 and 2 of the drawing, a vehicle body 10 is shown as having a roof portion 12, a front windshield 14 and a rear window 16. The roof 12 is commonly formed of a metallic material. The body construction, other than as described herein, is conventional in motor vehicles. Opposite ends of the roof portion 12 merge into a front wall defined by the windshield and the rear window. Opposite sides of the roof merge into said walls which are commonly provided with doors and windows. The metal roof at the front can be provided with a box-like frame portion 18. It can also be provided at the rear with a similar box-like portion 20. At the side the roof can be shaped and reinforced to provide a box-like frame 22 which can have a pair of lugs 24 struck therefrom to serve as headlining supporting means. A molding plate 26 can be provided engaged with the box-like frame 22 in a tight friction fit, as illustrated.

Box-like frame 22 includes an upright shoulder portion 28 as a backing for a resilient snap-in type headliner 30. Upper gently U-shaped or curved portion 32 along the inner edge of the molding 26 is positioned so as to be resiliently juxtaposed against the shoulder 28 so as to frictionally retain a lower end 34 of the headliner 30 when engaged therebetween. For this purpose, it is generally desirable that curved portion 32 of molding 26 be of a spring-like material for biasing against the shoulder 28. Lugs 24 limit the endward or downward movement of the end 34 of the liner 30 as well as providing a rest therefor. The front and rear wall portions can be provided with similar lugs and molding plate as desired so as to be adapted to receive opposite corresponding lower edges of the headliner. However, the front and rear wall supporting wall portions are illustrated in FIGURE 1 as being of a somewhat different construction, with the front and rear moldings 36 being screwed or otherwise fastened to the box-like frames 18 and 20 by use of conventional screws 38. It is also desirable that the moldings 36 be of resilient material so that they can be biased against flat juxtaposed shoulders 40 and 42 of the frames 18 and 20, respectively. Screws 38 are engaged through moldings 36 and shoulders 40 and 42 in the conventional manner.

Thus, in installing a headliner 30 within vehicle body 10, the opposite lower side edges 34 of the headliner are snapped into position between their respective curved molding portions 32 and box frames 22, and adjusted to the proper position. Front and rear moldings 36 are then attached by means of the screws 38 to firmly clamp the headliner 30 along its front and rear edges to the body 10. It is of course understood that this is an example of just one possible automotive body construction adapted to receive a snap-in headliner and that many other vehicle body arrangements might be constructed so as to receive snap-in vehicle headliners constructed according to the principles of the present invention.

One of these other possible arrangements is illustrated in FIGURE 3. This represents a substantially flatter roof portion 52 than that previously described. The roof has side peripheral flanges 54 containing grooves 56 for receiving corresponding edges 58 of a headliner 60. It can be appreciated that because the roof portion 52 is relatively flat, the headliner 60 will not be able to be bowed upwardly as greatly as it would be in a more highly arched roof portion, the latter as illustrated in FIGURE 2 for example. Because of this it is even more important that the headliner be able to support its own weight, for as the amount of bowing decreases, greater will be the effect of its own weight, particularly as one considers the portions thereof located near the headliner center.

To provide proper bowing of headliner 60, at least to the degree possible, it is desirable that it be made larger than the roof portion 52. In this way, when peripheral edges 58 are located in grooves 56, a bowing of headliner 60 will be greater than the arch of the roof portion 52, thus assuring a snug, non-vibrating fit of the headliner.

The details of typical headliner 30 are more readily apparent in FIGURES 4 and 5. As stated previously, the present invention makes use of a thermoplastic sheet, such as a polymethyl methacrylate, copolymers of styrene and methyl methacrylate, and styrene polymers in weight and gauges not normally capable of supporting their own weight, without sagging, when high temperatures (140° F. or above) are incurred. Such materials should be of a gauge and composition so as to be generally rigid but still being sufficiently flexible so they can be rolled at least almost into a cylinder for ease of installation in the confined space of a vehicle interior.

One such thermoplastic material which will work well for the present invention is a high impact polystyrene formulation which has been found to have three to five times greater impact strength and ten times greater elongation ability than general purpose polystyrene. It is commonly produced as a flat sheet in a variety of sizes and thicknesses, and generally contains from 1 to 15 percent rubber to give it some pliability. Methods which can be used for producing this or similar materials are described at some length in U.S. Patent No. 2,694,692 issued on November 16, 1954 to J. L. Amos et al., and U.S. Patent No. 2,727,884 issued on December 20, 1955 to D. L. McDonald et al.

Thus, a good plastic sheet for the present invention will be one that, before ever being subjected to temperatures much above room temperature, is generally rigid enough so that it can not be bent at sharp angles (90°–180°) without cracking or breaking but is flexible enough so that a reasonable length of the sheet can be rolled into a cylinder, as in FIGURE 6 to be described in more detail later, or at least bowed into a semi-circle. However, even these semi-rigid thermoplastic sheets tend to lose their rigidity when subjected to the high temperatures (140° F. plus) often encountered in vehicle roofs. Usually this loss of rigidity is so great that the thermoplastic sheet is unable to even support its own weight over an area as great as that of a vehicle roof portion. For example, the heat distortion temperature of a specific high impact polystyrene tested at 264 p.s.i., is only 165° F. When such temperatures are encountered, relief of the stresses within a sheet occurs and, because of the continued lack of tension in its bowed condition then resulting after it is again cooled, it becomes unsatisfactory as a headliner.

However, by following the principles of the present invention plastics like high impact polystyrene and modified homologues thereof, which would make unsatisfactory headliners by themselves, become readily adaptable for such use and are generally inexpensive. It is of course understood that other thermoplastic materials having similar characteristics are likewise usable in the present invention, such as a copolymer of styrene and acrylonitrile or a mixture of styrene and acrylonitrile and a minor proportion of natural or synthetic rubber.

Resistance to sagging at high temperatures and the required rigidity can be contributed to a thermoplastic sheet 46 of headliner 30 by use of a wide mesh iron screening 44 embedded in the sheet. A wire mesh that is readily adapted for such use in the present invention is that commonly known as "chicken wire." This wire is a relatively inexpensive coarse mesh and possesses the generally desirable ductile characteristics, that is, a material capable of being deformed under load without fracture. Because of the thermal nature and ready formability of such wire prior to embedding in the plastic, the headliner is easily molded, but once molded is not easily deformed. Neither the plastic alone nor the wire alone would provide a satisfactory headliner structure. That is, the plastic would not support its own weight at elevated temperatures and the "chicken wire" mesh would not have the necessary resiliency to snap back into its original position once deformed. However, by putting these relatively inexpensive units together in a manner according to the present invention, the wire reinforces the plastic to give the latter the required strength at elevated temperatures while the plastic provides the wire with the required elasticity which tends to return it to its original condition after being flexed.

As stated previously, because of the nature of the wire mesh component the headliner combination has the ability to support its own weight at temperatures where the plastic alone would fail. In other words, one might describe this by stating that the thermoplastic sheet 46 and wire mesh 44, serve to reinforce one another where the latter is sufficiently embedded into the plastic. By freezing the geometric pattern of the metal in the plastic a force is necessarily asserted in the metal and plastic to return the headliner to its original shape, after a distortion, this original shape being determined at the time of joining the plastic to the metal when the plastic was in a somewhat molten or tacky state.

Another advantage of a headliner constructed according to the present invention is that it can employ the tacky natural adhesive characteristic of most usable thermoplastic materials. This, in effect, provides for a self-contained adhesive when it is desired to attach other materials thereto. For example, a headliner 30 generally would have a decorative surface or fabric 48 attached to the underside thereof and an insulating material 50, such as jute or urethane foam, attached to the upper side thereof. In the slightly heated and molten state of the thermoplastic sheet 46, the decorative fabric 48 and the insulating material 50 can be attached thereto simply by being brought into contact with the tacky thermoplastic material. However, if it is desired to attach the fabric or insulating material to the plastic sheet 46 after it is already cured, a spray solvent like toluene can be used to soften the plastic to its adhesive state after which the fabric 48 and material 50 can be just stuck thereto. It is also understood that there are other numerous ways of attaching such fabrics and other materials, such as by vacuum and heat, right after the headliner 30 is formed.

A number of methods for producing the above-described reinforced headliner installation are possible, one such method being the use of a platen press (not shown) where a bottom platen of the press is left at room temperature and the temperature of an upper platen is raised. The thermoplastic material is then laid on the unheated bottom platen of the press and the wire mesh is placed on it. The heated top platen is then brought down on the thermoplastic material. Where full embedding is not desired the heated top platen need not contact the thermoplastic material directly, as direct contact is instead made with the wire only. The heat from the top platen is transferred to the wire where it is in turn transferred to the thermoplastic material. In these areas of contact, the wire sends heat into the body of the thermoplastic material.

The plastic sheet forming the headliner should be of gauge so as to provide substantial rigidity, as well as flexibility, as indicated previously. It has been found that a sheet of material like the aformentioned high impact polystyrene of 15 mil thickness is rather flimsy, but workable when combined with a wire mesh. It has also been found that a sheet of such material having a thickness of 60 mils is approaching that of a sheet too rigid to provide the flexibility necessary or desirable. Generally, a sheet of high impact polystyrene less than 10 mils thick and more than 60 mils thick would be unsatisfactory. Sheets of about 15 to 40 mil thickness of such material generally provide the most desirable physical characteristics.

The apparent flexibility of the finished headliner 30 is indicated by a cylindrical roll of the headliner shown in FIGURE 6. In using about a four foot length of a headliner structure as described above, it should be able to roll up around about a six inch diameter, at least a diameter sufficient so that its opposite ends can be in an overlapping arrangement. It is conceivable that each vehicle headliner will be completely sized and formed as a finished unit when received by a vehicle manufacturer, be rolled as shown in FIGURE 6 just prior to installation, taken inside of the vehicle through a door or window opening, and be unrolled or snapped into place in the vehicle roof portion.

Accordingly, there has been described a novel snap-in type headliner for the interior of vehicle roofs. However, it is possible that the structure of the present invention can have application in other areas where a quick snap-in installation can be utilized. It is also conceivable that the structure of the present invention can take many different shapes and forms, as for example an embossed pattern 62 (FIGURE 7) might well be formed on the underside of a plastic sheet to give a decorative appearance without the necessity for additional fabric material pressed thereover. It is further conceivable that a plastic material might have qualities such that with a proper thickness the addition of insulated material to the upper side thereof would be unnecessary.

It should be noted here that while headliner 60 shows mesh 44 completely embedded in sheet 46, headliner 30 shows mesh 44 only partially embedded in sheet 46. Whether full or only partial embedding occurs depends on the relative thickness of the plastic sheet 46 and mesh 44. However, when partial embedding occurs it has been found that some fluffing or protrusion of the sheet, as indicated by reference character 66, can be made to extend above the non-embedded side of the mesh so that direct contact between the roof portion of a vehicle and the mesh is avoided if no insulation is used as a backing on the headliner.

The main prerequisites thus are that a satisfactory headliner must be strong and lightweight, have a balanced degree of rigidity and flexibility at temperatures common in vehicle roof portions, and be substantially inexpensive. While certain representative embodiments and details have been shown for the purpose of illustrating the invention, it will be apparent to those skilled in the art that various changes and modifications can be made therein without departing from the spirit and scope of the invention.

Accordingly, what is claimed as new is:

1. The combination of a vehicle roof portion and a headliner therefor, headliner retaining means on said roof portion adjacent extremities of said headliner, peripheral edges of said headliner engaged by said retaining means, said headliner comprising a body portion formed of a high impact thermoplastic material, a ductile element partially embedded in said body portion on the side thereof facing said roof portion integral protrusions of said material extending from said side and beyond exposed portions of said element to prevent contact of the latter with said roof portion, said protrusions disposed generally over the surface of said side to prevent contact of said element with the roof portion.

2. The combination of claim 1 wherein said body portion has a thickness of about 15 to 40 mils.

3. The combination of claim 2 wherein said body portion is formed from high impact polystyrene.

References Cited by the Examiner

UNITED STATES PATENTS

| | | | |
|---|---|---|---|
| 1,923,512 | 8/33 | Stein | 154—47 |
| 1,968,531 | 7/34 | Ledwinka | 296—137 |
| 2,674,488 | 4/54 | Lyijnen et al. | 296—137 |
| 2,763,586 | 9/56 | Noyes. | |
| 3,030,255 | 4/62 | Winston | 154—47 |
| 3,042,446 | 7/62 | Stahl | 296—137 |
| 3,068,043 | 12/62 | Komenda | 297—137 X |

A. HARRY LEVY, *Primary Examiner.*

PHILIP ARNOLD, *Examiner.*